(12) United States Patent
Moride et al.

(10) Patent No.: US 8,790,102 B2
(45) Date of Patent: Jul. 29, 2014

(54) INJECTION MOLDING APPARATUS

(75) Inventors: Kenshiro Moride, Nissin (JP);
Yukitaka Matsuda, Toyota (JP)

(73) Assignee: Toyota Jidosha Kabushiki Kaisha,
Toyota-Shi (JP)

( * ) Notice: Subject to any disclaimer, the term of this patent is extended or adjusted under 35 U.S.C. 154(b) by 96 days.

(21) Appl. No.: 13/642,419

(22) PCT Filed: Apr. 12, 2011

(86) PCT No.: PCT/IB2011/001150
§ 371 (c)(1),
(2), (4) Date: Oct. 19, 2012

(87) PCT Pub. No.: WO2011/132081
PCT Pub. Date: Oct. 27, 2011

(65) Prior Publication Data
US 2013/0032972 A1  Feb. 7, 2013

(30) Foreign Application Priority Data

Apr. 20, 2010 (JP) .................................. 2010-097445

(51) Int. Cl.
*B29C 45/40* (2006.01)

(52) U.S. Cl.
CPC ....... *B29C 45/401* (2013.01); *B29C 2045/4021* (2013.01)
USPC .......................................... 425/139; 425/556

(58) Field of Classification Search
CPC ...................... B29C 45/401; B29C 2045/4021
USPC ................................................ 425/139, 556
See application file for complete search history.

(56) References Cited

U.S. PATENT DOCUMENTS

2008/0003320 A1*   1/2008   Saito et al. ................... 425/139

FOREIGN PATENT DOCUMENTS

| JP | 62-116121 A | 5/1987 |
| JP | 01-059615 U | 4/1989 |
| JP | 05-016854 U | 3/1993 |
| JP | 07-266367 A | 10/1995 |
| JP | 2005-178066 A | 7/2005 |
| JP | 2007-307805 A | 11/2007 |
| JP | 2008-068303 A | 3/2008 |

OTHER PUBLICATIONS

International Search Report & Written Opinion of PCT/IB2011/001150 mailed Sep. 12, 2011.
Office Action dated Jul. 20, 2012 in JP 2010-097445 and English translation thereof.

* cited by examiner

*Primary Examiner* — Jill Heitbrink
(74) *Attorney, Agent, or Firm* — Kenyon & Kenyon LLP

(57) ABSTRACT

The injection molding employing a mold that includes a molding surface in which a pin hole is formed, and at least one ejector pin that is inserted through the pin hole and that includes an outer peripheral surface facing an inner peripheral surface of the pin hole; includes closing a mold, injecting material into the mold, setting the material, opening the mold, and extruding the material by making a tip end surface of the at least one ejector pin protrude out of a pin hole. The tip end surface is recessed from the molding surface by a predetermined distance in a direction opposite a direction in which the material is extruded, while injecting the material into the mold.

4 Claims, 14 Drawing Sheets

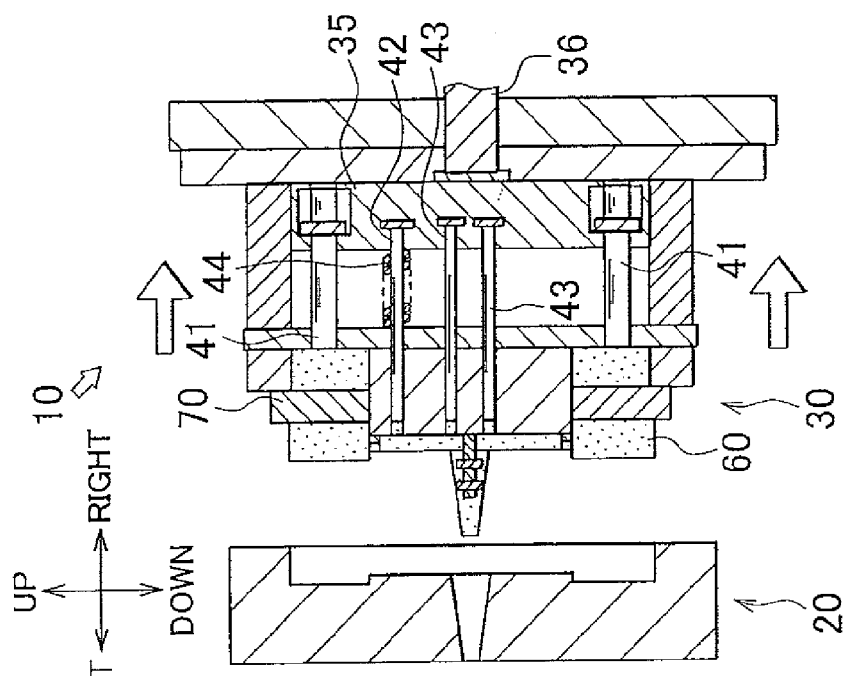
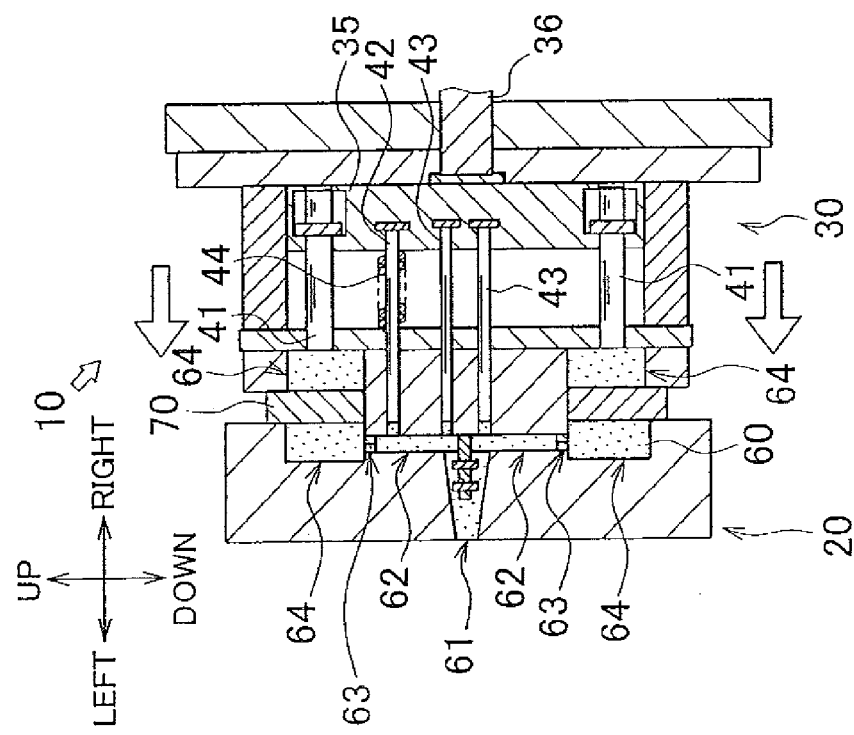

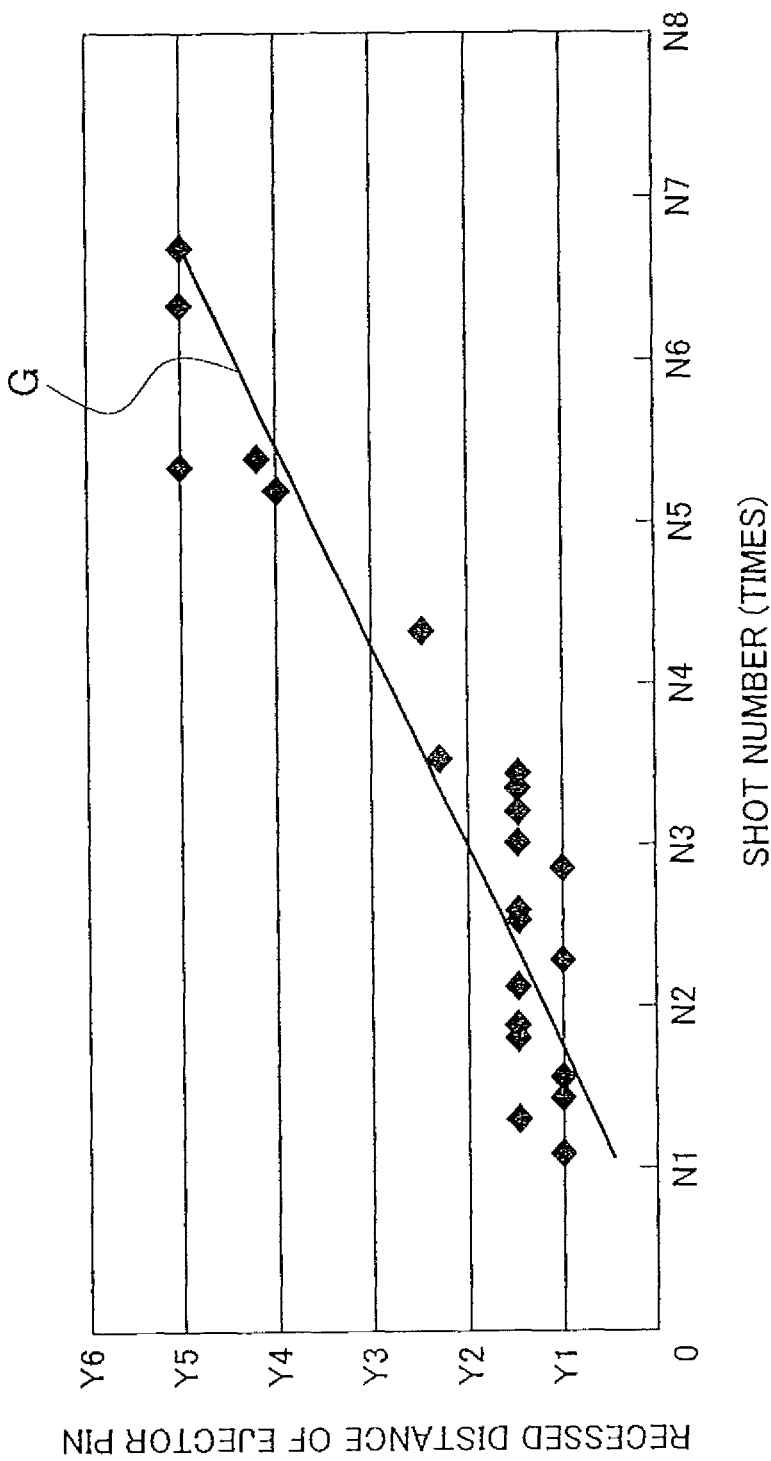

INJECTION MOLDING APPARATUS

This is a 371 national phase application of PCT/IB2011/001150 filed 12, Apr. 2011, claiming priority to Japanese Patent Application No. 2010-097445 filed 20 Apr. 2010, the contents of which are incorporated herein by reference.

BACKGROUND OF THE INVENTION

1. Field of the Invention

The invention relates to technology of an injection molding apparatus that, after closing a mold, injecting molten resin material or the like into the mold, setting the resin material or the like, and opening the mold, extrudes the molded resin using an ejector pin, and relates to technology of an injection molding method that, after closing a mold, injecting molten resin material or the like into the mold, setting the resin material or the like, and opening the mold, extrudes the molded resin using an ejector pin.

2. Description of the Related Art

Injection molding using an injection molding apparatus is performed when molding a work with resin. This kind of injection molding is used, for example, when molding an insert coil with thermosetting resin in order to improve radiation performance of the insert coil that serves as a work 170, as shown in FIG. 11 (see reference character 170 in FIG. 11).

An injection molding apparatus 110 that performs this kind of injection molding includes a fixed die 120, a movable die 130, an ejector plate 135, and ejector pins 140 and the like, as shown in FIG. 12A. The movable die 130 is able to move closer to and farther away from the fixed die 120. The ejector plate 135 is arranged inside the movable die 130, and is able to move toward the fixed die 120 by being driven by an ejector rod 136. The ejector plate 135 is urged away from the fixed die 120 by a spring 144 provided on one of the ejector pins 140. As shown in FIG. 12B, one end portion of each of the ejector pins 140 is inserted through a corresponding pin hole 132 formed in the movable die 130, and the other end portion of each of the ejector pins 140 is supported by the ejector plate 135. The one end surface of each of the ejector pins 140 is arranged in line with an end surface of the movable die 130 (i.e., flush with the end surface of the movable die 130).

With the injection molding apparatus 110 structured in this way, the mold is closed by bringing the movable die 130 that supports the work 170 toward the fixed die 120. Then molten resin 160 is injected from the fixed die 120 and set. Also, the mold is opened by moving the movable die 130 away from the fixed die 120, as shown in FIG. 13A. After opening the mold, portions corresponding to a gate portion and a runner portion and the like of the resin 160 are extruded by driving the ejector rod 136 to make the ejector pins 140 protrude out of the pin holes 132, as shown in FIG. 13B. Then, a portion corresponding to a cavity portion of the resin 160 is extruded, as shown in FIG. 14A. Next, the ejector rod 136 stops being driven, such that the ejector pins 140 are returned by the spring 144 to the positions they were in before extruding the resin 160. It is in this way that the injection molding apparatus 110 performs injection molding.

With this kind of injection molding apparatus 110, when injecting the resin 160, there is a possibility that the ejector pins 140 may not return all the way to the positions they were in before extruding the resin 160 due to the resin 160 getting into a clearance 145 (see FIG. 12B) formed between the ejector pins 140 and the pin holes 132. That is, there is a possibility that the ejector pins 140 may remain protruding out from the pin holes 132, as shown in FIG. 14B. Also, greater force is needed to make the ejector pins 140 protrude out from the pin holes 132, so there is chance that a molded article 171 may not be able to be extruded. With such an injection molding apparatus 110, an operational problem results from the resin 160 getting into the clearance 145. In this case, the injection molding apparatus 110 requires maintenance to remove the resin 160 that has gotten into the clearance 145.

Japanese Patent Application Publication No. 7-266367 (JP-A-7-266367) describes an injection molding apparatus that solves this problem.

The injection molding apparatus described in JP-A-7-266367 performs maintenance molding by performing injection molding with the ejector pins arranged in positions that are retracted farther than the positions where normal injection molding has been performed (i.e., in positions away from the molded article), after injection molding such as that described above has been performed a predetermined number of times. As a result, resin that gets into the clearance is removed.

However, with the injection molding apparatus described in JP-A-7-266367, the amount of resin used increases by the amount used for the maintenance molding, so the injection molding manufacturing cost ends up increasing. From the viewpoint of manufacturing cost, it is conceivable to reduce the frequency with which the maintenance molding is performed, that is, perform maintenance molding after normal injection molding has been performed a greater number of times, but this may result in resin getting into the clearance. That is, the likelihood that there will be an operational problem with the injection molding apparatus, such as that described above, would increase.

SUMMARY OF THE INVENTION

The invention thus provides an injection molding apparatus capable of inhibiting an operational problem from occurring during injection molding, and provides an injection molding method capable of inhibiting an operational problem from occurring during injection molding.

A first aspect of the invention relates to an injection molding apparatus that includes; a mold that includes a molding surface in which a pin hole is formed; and at least one ejector pin that is inserted through the pin hole and that includes an outer peripheral surface facing an inner peripheral surface of the pin hole; and that extrudes the material by making a tip end surface of the at least one ejector pin protrude out of the pin hole after closing a mold, injecting material into the mold, setting the material, and opening the mold. The injection molding apparatus recesses the tip end surface of the ejector pin from the molding surface by a predetermined distance in a direction opposite a direction in which the material is extruded, while injecting the material into the mold.

In the injection molding apparatus described above, the predetermined distance may be set so as to increase by increase of a number of times that a molded article is molded by injecting the material into the mold.

In the injection molding apparatus described above, when the predetermined distance is designated Y (mm) and a number of times that a molded article is molded by injecting the material into the mold is designated N (times), the predetermined distance may be set such that an expression $Y=7.98 \times 10^{-5} N - 0.039$ is satisfied.

In the injection molding apparatus described above, the number of times that the molded article is molded may be a shot number corresponding to the life of the injection molding apparatus. In the injection molding apparatus described above, the number of times that the molded article is molded may be a target number of times that the molded article is able to be molded without maintenance being performed on the injection molding apparatus.

In the injection molding apparatus described above, a protrusion that protrudes toward a radially inner side of the ejector pin may be formed on an upstream inner peripheral surface of the pin hole in a flow direction of the material, between the molding surface and the tip end surface of the ejector pin. Also, a protruding length of the protrusion may be set to a length at which the protrusion will not interfere with a protruding operation of the ejector pin.

In the injection molding apparatus described above, at least one protrusion that protrudes in a direction in which the material is extruded may be formed on the tip end surface of the ejector pin.

In the injection molding apparatus described above, the injection molding apparatus may form a recess in a portion of the molding surface that corresponds to the tip end surface by recessing the tip end surface from the molding surface by a predetermined distance in a direction opposite a direction in which the material is extruded.

In the injection molding apparatus described above, when a diameter of the ejector pin is designated W (mm), a length in a radial direction of the ejector pin from an upstream end portion of the ejector pin in a flow direction of the material to an upstream end portion of the pin hole corresponding to the ejector pin in the flow direction of the material is designated y (mm), the predetermined distance is designated Y (mm), and an angle created between an axial direction of the ejector pin and a direction in which the material flows into the recess is designated θ (°), flow of the material may be controlled such that an expression $\cot(y/Y) \leq \theta \leq \cot\{(W+y)/Y\}$ is satisfied.

In the injection molding apparatus described above, when a diameter of the ejector pin is designated W (mm), a length in a radial direction of the ejector pin between an upstream inner peripheral surface of the pin hole in a flow direction of the material and an upstream outer peripheral surface of the ejector pin in the flow direction of the material is designated y (mm), the predetermined distance is designated Y (mm), and an angle created between an axial direction of the ejector pin and a direction in which the material flows into the recess is designated θ (°), flow of the material may be controlled such that an expression $\cot(y/Y) \leq \theta \leq \cot\{(W+y)/Y\}$ is satisfied.

A second aspect of the invention relates to an injection molding apparatus. The injection molding apparatus includes a mold that includes a molding surface in which a pin hole is formed, and at least one ejector pin that is inserted through the pin hole and that includes a outer peripheral surface facing an inner peripheral surface of the pin hole. The injection molding apparatus extrudes the material by making a tip end surface of the at least one ejector pin protrude out of the pin hole after closing a mold, injecting material into the mold, setting the material, and opening the mold. The injection molding apparatus recesses the tip end surface of the ejector pin from the molding surface by a predetermined distance in a direction opposite a direction in which the material is extruded, while injecting the material into the mold.

A first aspect of the invention relates to an injection molding method employing a mold that includes a molding surface in which a pin hole is formed, and at least one ejector pin that is inserted through the pin hole and that includes an outer peripheral surface facing an inner peripheral surface of the pin hole. The injection molding method includes closing a mold, injecting material into the mold, setting the material, opening the mold, and extruding the material by making a tip end surface of the at least one ejector pin protrude out of a pin hole. The tip end surface is recessed from the molding surface by a predetermined distance in a direction opposite a direction in which the material is extruded, while injecting the material into the mold.

The foregoing aspects of the invention make it possible to inhibit material from getting into a clearance when injecting material (resin) into a mold, and thus make it possible to inhibit an operational problem from occurring during injection molding.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3A is a front sectional view of an injection molding operation according to the example embodiment of the invention, showing a state in which resin is filled;

FIG. 3B is a front sectional view of the injection molding operation according to the example embodiment of the invention, showing a state in which the mold is open;

FIG. 6 is a graph showing a correlation between the number of moldings and the distance that the ejector pins are recessed from the molding surface, and according to the example embodiment of the invention;

DETAILED DESCRIPTION OF EMBODIMENTS

Hereinafter, an injection molding apparatus 10 according to one example embodiment of the injection molding apparatus of the invention will be described with reference to the accompanying drawings.

The injection molding apparatus 10 molds material such as resin into a predetermined shape. The injection molding apparatus 10 in this example embodiment molds unsaturated polyester resin (i.e., resin 60) that is thermosetting resin around an insert coil that serves as a work 70.

Figure 1:
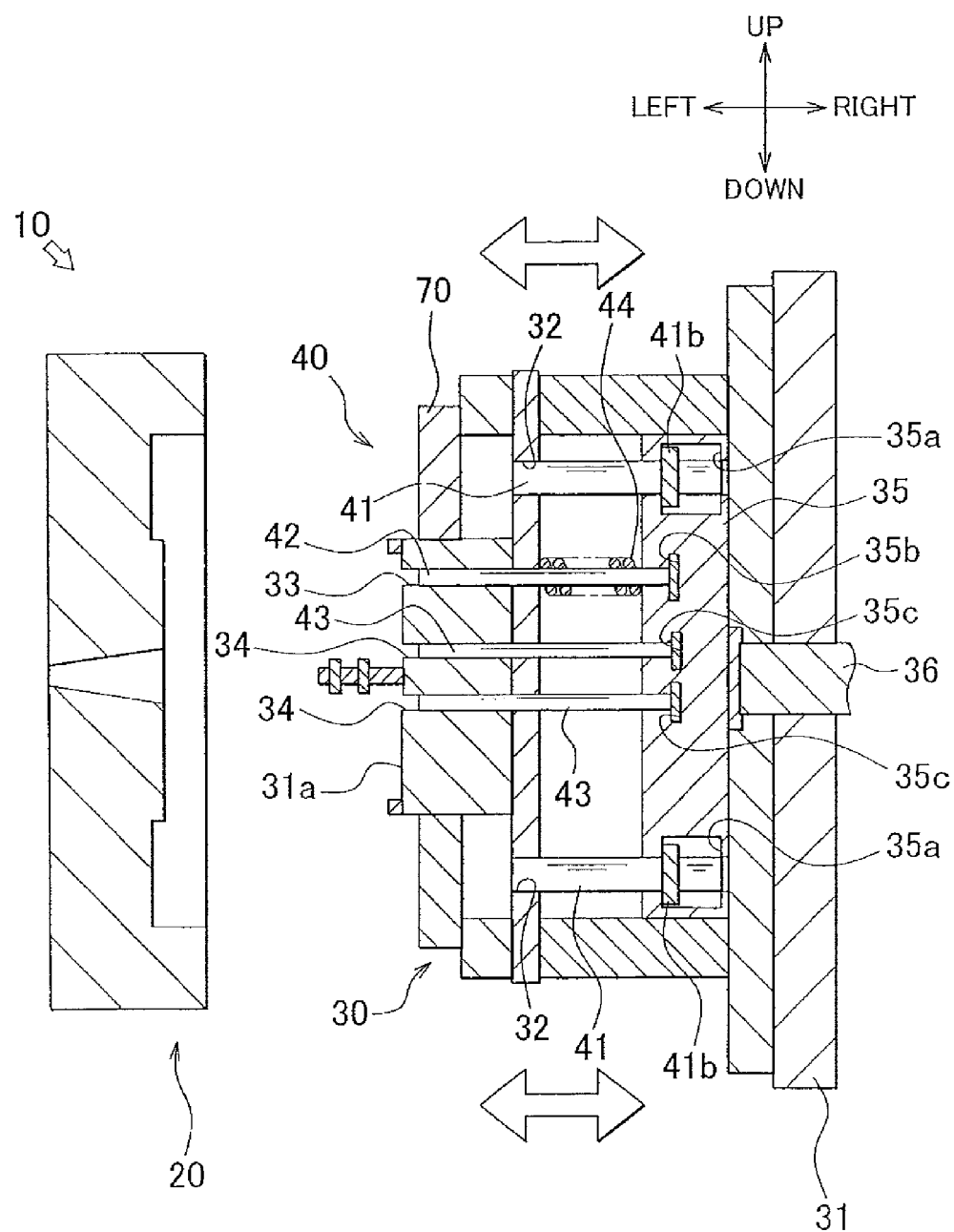
FIG. 1 is a front sectional view of the overall structure of an injection molding apparatus according to an example embodiment of the invention.

Incidentally, hereinafter to simplify the description, the directions left and the right are defined based the left and right directions with respect to the paper on which FIG. 1 is drawn. Also, the directions up and down are defined based the up and down directions with respect to the paper on which FIG. 1 is drawn.

As shown in FIG. 1, the injection molding apparatus 10 includes a fixed die 20 and a movable die 30 that together form a mold.

The fixed die 20 has an open portion that is open to the outside from a left end portion and gradually increases in diameter toward the right. The fixed die 20 is connected at the left end portion to an injecting portion, not shown, and resin 60 injected from the injecting portion passes through the open portion.

The movable die 30 is configured to, be able to move closer to and farther away from the fixed die 20, and supports the work 70 at a left end portion (i.e., the end portion on the side closer to the fixed die 20). The movable die 30 includes an ejector plate 35, an ejector rod 36, and ejector pins 40 (i.e., first ejector pins 41, a second ejector pin 42, and third ejector pins 43).

The ejector plate 35 is housed inside a movable die main body 31 and is able to slide inside the movable die main body 31. First housing portions 35a, a second housing portion 35b, and third housing portions 35c are formed in the ejector plate 35.

The first housing portions 35a are spaces that are shaped so as to enable first ejector pins 41 that will be described later to slide a predetermined distance left and right, and house right end portions of the first ejector pins 41.

The second housing portion 35b is a space that is formed following the shape of a right end portion of the second ejector pin 42 that will be described later, and houses the right end portion of the second ejector pin 42.

The third housing portions 35c are spaces that are formed following the shapes of right end portions of the third ejector pins 43 that will be described later, and house the right end portions of the third ejector pins 43.

A left end portion of the ejector rod 36 is attached to the ejector plate 35, and a right end portion of the ejector rod 36 protrudes outside from the movable die main body 31. The ejector rod 36 is configured to be able to move left and right, and the ejector plate 35 moves left and right with this movement.

In this example embodiment, the ejector pins 40 are the first ejector pins 41, the second ejector pin 42, and the third ejector pins 43, and they ale attached to the ejector plate 35.

In this example embodiment, the ejector pins 40 include the first ejector pins 41, the second ejector pin 42, and the third ejector pins 43, but the invention is not limited to this. That is, the ejector pins 40 may be modified as appropriate according to the shape of the molded article 71. For example, the ejector pin 40 may be only a single first ejector pin 41.

Figure 2A:
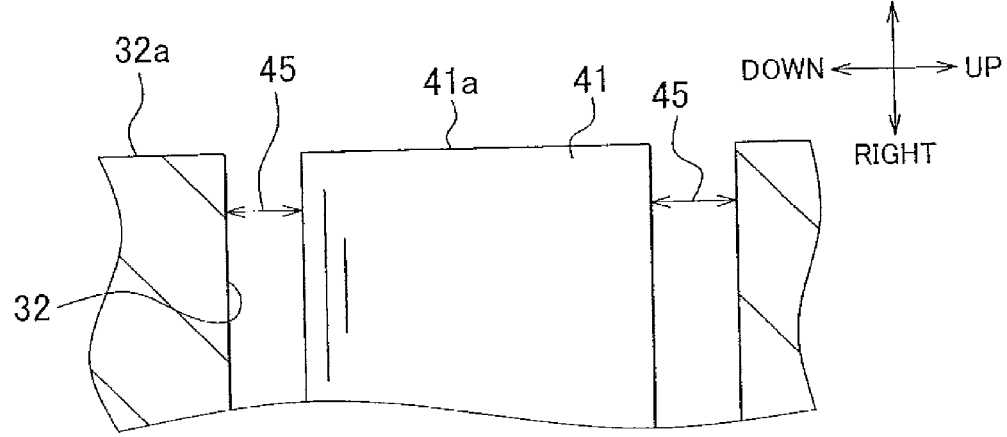
FIG. 2A is a view of a first ejector pin according to the example embodiment of the invention.

One of the first ejector pins 41 is arranged on an upper end portion of the movable die 30, and the other first ejector pin 41 is arranged on a lower end portion of the movable die 30. As shown in FIGS. 1 and 2A, the right end portions of the first ejector pins 41 are housed in the first housing portions 35a, and the left end portions of the first ejector pins 41 are inserted through first pin holes 32 that serve as pin holes formed in the movable die 30. The left end surfaces of the first ejector pins 41 are formed as tip end surfaces 41a. The tip end surfaces 41a are formed flat in FIG. 2A. The tip end surfaces 41a of the first ejector pins 41 are arranged in line with a molding surface 32a. That is, the tip end surfaces 41a of the first ejector pins 41 and the molding surface 32a that is a surface in which the first pin holes 32 are formed are arranged in the same straight line so as to be flush with each other.

Incidentally, of the plurality of first ejector pins 41, the first ejector pin 41 arranged on the lower end portion of the movable die 30 is structured just like the first ejector pin 41 arranged on the upper end portion of the movable die 30, except that the vertical (i.e., up-down) position where it is arranged is different. Therefore, in the following description, only the first ejector pin 41 arranged on the upper end portion of the movable die 30 will be described; the description of the first ejector pin 41 arranged on the lower end portion of the movable die 30 will be omitted.

A first clearance 45 that serves as a clearance is formed between this first ejector pin 41 and the first pin hole 32. The inside diameter of the first pin hole 32 and the outside diameter of the first ejector pin 41 are set such that resin 60 is unable to get into the first clearance 45. In this example embodiment, the length of the first clearance 45 in the radial direction of the first ejector pin 41, from the inner peripheral surface of the first pin hole 32 to the outer peripheral surface of the first ejector pin 41, is set to be 5 to 10 μm. That is, the difference between the inside diameter of the first pin hole 32 and the outside diameter of the first ejector pin 41 is set to be 10 to 20 μm.

Figure 2B:
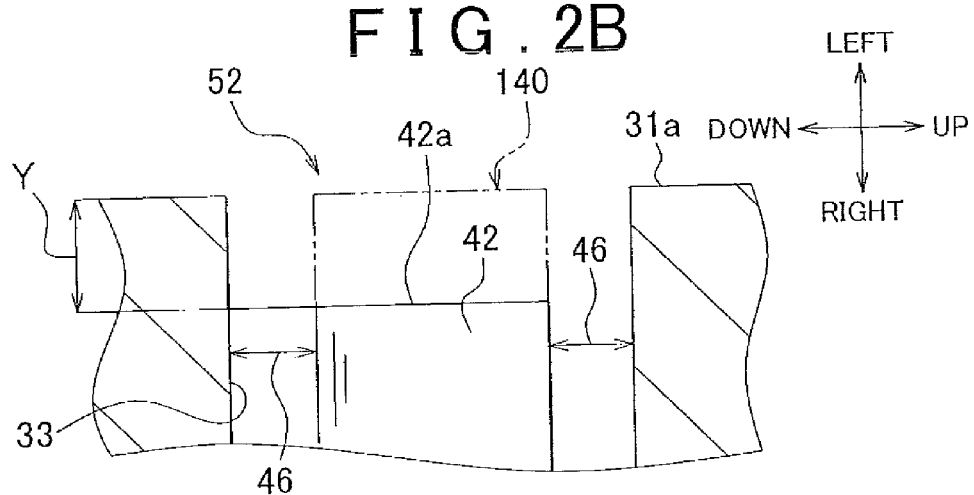
FIG. 2B is a view of a second ejector pin according to the example embodiment of the invention.

As shown in FIGS. 1 and 2B, the right end portion of the second ejector pin 42 is housed in the second housing portion 35b and the left end portion of the second ejector pin 42 is inserted through a second pin hole 33 that serves as a pin hole foamed in the movable die 30. The left end surface of the second ejector pin 42 is formed as a tip end surface 42a. The tip end surface 42a is formed flat in FIG. 2B. A spring 44 that urges the ejector plate 35 to the right is provided on a mid portion of the second ejector pin 42. The second ejector pin 42 is arranged such that the tip end surface 42a is a predetermined distance Y to the right of the molding surface 31a (see the ejector pin 140 that is arranged flush with the molding surface 31a, shown by the chain double-dashed line in FIG. 2B). That is, the tip end surface 42a of the second ejector pin 42 is arranged in a position recessed a predetermined distance Y from the molding surface 31a that is the surface in which the second pin hole 33 is formed, such that a recess 52 is formed in a portion of the molding surface 31a that corresponds to the second ejector pin 42.

A second clearance 46 that serves as a clearance is formed between this second ejector pin 42, and the second pin hole 33. The inside diameter of the second pin hole 33 and the outside diameter of the second ejector pin 42 are set such that the resin 60 is unable to get into the second clearance 46. In this example embodiment, the length of the second clearance 46 in the radial direction of the second ejector pin 42, from the inner peripheral surface of the second pin hole 33 to the outer peripheral surface of the second ejector pin 42, is set to be the same as that of the first clearance 45.

Figure 2C:
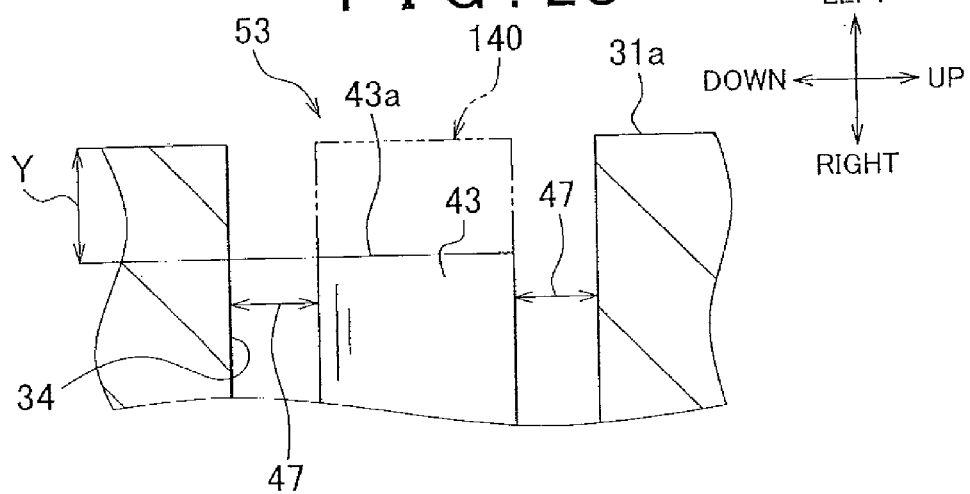
FIG. 2C is a view of a third ejector pin according to the example embodiment of the invention.

As shown in FIGS. 1 and 2C, the third ejector pins 43 are arranged parallel in the vertical direction at a vertically center portion of the movable die 30. The right end portions of the third ejector pins 43 are housed in the third housing portions 35c, and the left end portions of the third ejector pins 43 are inserted through third pin holes 34 that serve as pin holes formed in the movable die 30. The left end surfaces of the third ejector pins 43 are formed as tip end surfaces 43a. The tip end surfaces 43a are formed flat in FIG. 2C. The third ejector pins 43 are arranged such that the tip end surfaces 43a are a predetermined distance to the right of the molding surface 31a (see the ejector pin 140 that is arranged flush with the molding surface 31a, shown by the chain double-dashed line in FIG. 2C). That is, the tip end surfaces 43a of the third ejector pins 43 are arranged in positions that are recessed a predetermined distance Y from the molding surface 31a that is the surface in which the third pin holes 34 are formed, such that recesses 53 are formed in portions of the molding surface 31a that correspond to the third ejector pins 43.

Incidentally, of the plurality of third ejector pins 43, the lower third ejector pin 43 is structured just like the upper third ejector pin 43, except that the vertical position where it is arranged is different. Therefore, in the following description, only the upper third ejector pin 43 will be described; the description of the lower third ejector pin 43 will be omitted.

A third clearance 47 that serves as a clearance is formed between the third ejector pin 43 and the third pin hole 34. The inside diameter of the third pin hole 34 and the outside diameter of the third ejector pin 43 are set such that the resin 60 is unable to get into the third clearance 47. In this example embodiment, the length of the third clearance 47 in the radial direction of the third ejector pin 43, from the inner peripheral surface of the third pin hole 34 to the outer peripheral surface of the third ejector pin 43, is set to be the same as that of the first clearance 45. Also, the tip end surface 42a of the second ejector pin 42 and the tip end surface 43a of the third ejector pin 43 are arranged to the right of the molding surface 31a by the same distance Y (see arrow Y in FIGS. 2B and 2C).

The tip end surfaces 41a, 42a, and 43a of the ejector pins 40 are made to protrude from the corresponding pin holes 32, 33, and 34 formed in the molding surfaces 32a and 31a, by moving the ejector plate 35 to the left, which is accomplished by driving the ejector rod 36.

As shown in FIG. 3A, when the mold is closed by bringing the movable die 30 toward the fixed die 20, a sprue portion 61, a runner portion 62, a gate portion 63, and a cavity portion 64 are formed between the fixed die 20 and the movable die 30.

In the following description, the upstream side of the injection molding apparatus 10 and the downstream side of the injection molding apparatus 10 are defined based on the direction of flow of the resin 60.

The sprue portion 61 is formed in the open portion of the fixed die 20. The resin 60 that is injected from the injecting portion is injected into this sprue portion 61. The resin 60 then flows toward the runner portion 62.

The runner portion 62 is communicated with the downstream end portion of the sprue portion 61. The second ejector pin 42 and the third ejector pin 43 are arranged on the right side of the runner portion 62. That is, the recess 52 and the recess 53 are both communicated with the runner portion 62. The resin 60 that has flowed to the runner portion 62 then flows toward the gate portion 63.

The gate portion 63 is formed such that the sectional area in a direction perpendicular to the flow direction of the resin 60 is smaller than the sectional area of the runner portion 62. This gate portion 63 is communicated with the downstream end portion of the runner portion 62. The resin 60 that has flowed to the gate portion 63 then flows toward the cavity portion 64.

The cavity portion 64 is communicated with the downstream end portion of the gate portion 63. The first ejector pin 41 is arranged on the right side of the cavity portion 64.

In this way, the resin 60 that has been injected through the sprue portion 61 flows from the sprue portion 61 to the runner portion 62, from the runner portion 62 to the gate portion 63, and then from the gate portion 63 to the cavity portion 64. That is, the resin 60 that has been injected through the sprue portion 61 is filled into the cavity portion 64 formed by the fixed die 20 and the movable die 30. Also, the shape (i.e., the sectional area in the direction perpendicular to the flow direction of the resin 60) of the runner portion 62 is formed smaller than the shape (i.e., the sectional area in the direction perpendicular to the flow direction of the resin 60) of the cavity portion 64. Therefore, the flowrate of the resin 60 that flows through the runner portion 62 is faster than the flowrate of the resin 60 that flows through the cavity portion 64.

Next, the operating mode of the injection molding apparatus 10 will be described. First, as shown in FIG. 3A, the mold is closed by bringing the movable die 30 toward the fixed die 20, after which the resin 60 is injected into the fixed die 20 and the movable die 30 by the injecting portion. The resin 60 is heated by the injecting portion to a predetermined temperature so that it is in a liquid molten state, and then injected toward the fixed die 20 at a predetermined injection pressure by being pushed out by a cylinder or the like.

Figure 4:
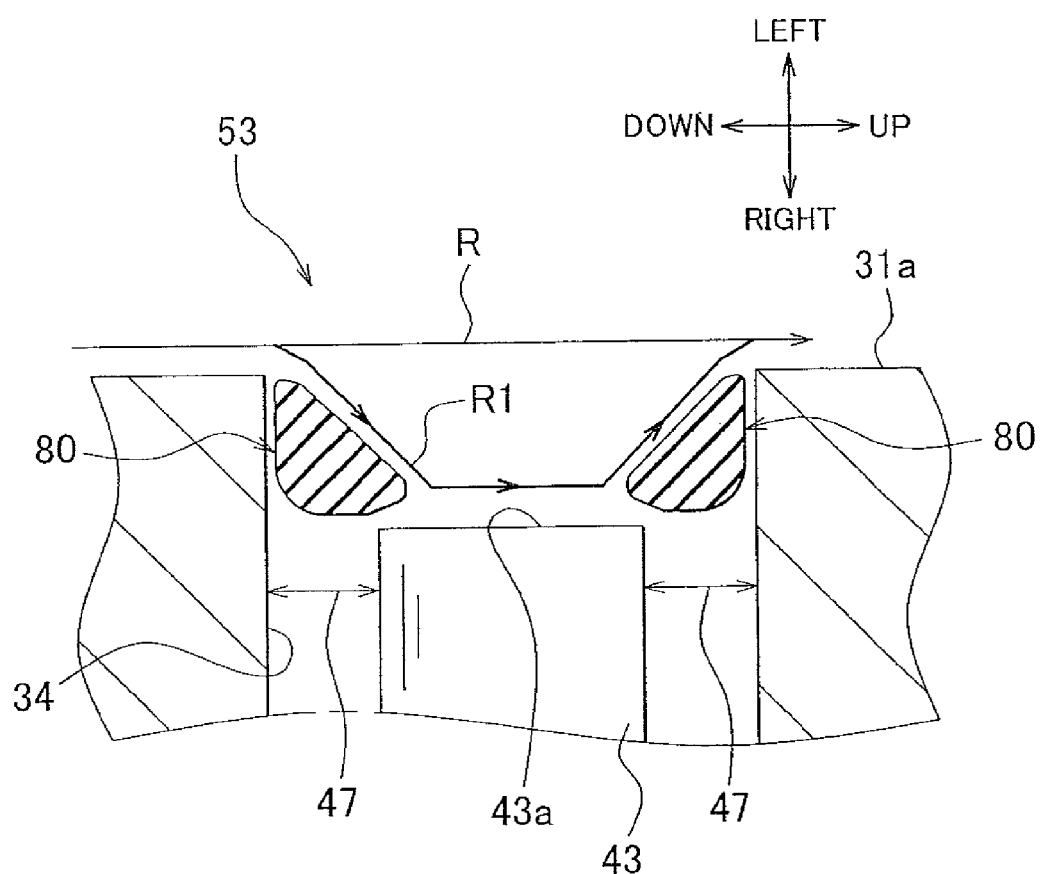
FIG. 4 is a view of a dead water region according to the example embodiment of the invention.

As shown in FIG. 4, the resin 60 that flows through the runner portion 62 flows toward the recess 53 (see arrow R1 in FIG. 4). The flowrate of the resin 60 that flows through the runner portion 62 is relatively fast, so a dead water region 80 forms in the recess 53. The dead water region 80 is formed to the left of the third clearance 47, and is fowled in a tapered shape, with the length in the left-right direction gradually becoming shorter toward the axial center of the third ejector pin 43.

Here, this dead water region 80 typically refers to a region where there is no flow at a water surface or the like, and in this example embodiment, it refers to a region into which the flowing resin 60 does not flow. That is, the forming this dead water region 80 to the left of the third clearance 47 results in the resin 60 flowing only to the left of the third ejector pin 43 when the resin 60 is injected, thus making it possible to inhibit the resin 60 from flowing to the left of the third clearance 47. In this way, at the recess 53 that is formed on the tip end side of the third ejector pin 43, the resin 60 only flows into the portion corresponding to the tip end surface 43a. The portion corresponding to the third clearance 47 is the dead water region 80, so the resin 60 does not flow into this portion.

Similar to the recess 53, at the recess 52 as well, the dead water region 80 forms to the left of the second clearance 46. Accordingly, the resin 60 is able to be inhibited from flowing into the second clearance 46.

Here, as shown in FIG. 2A, the first ejector pin 41 is arranged such that the tip end surface 41a is in line with the molding surface 32a. In other words, a recess is not formed at the portion of the molding surface 32a that corresponds to the first ejector pin 41.

This is because the flowrate of the resin 60 that flows through the cavity portion 64 is slower than the flowrate of the resin 60 that flows through the runner portion 62, as described above.

For example, if a recess is not formed in the molding surface 32a and the flowrate of the resin 60 flowing over the pin hole through which the ejector pin 40 is inserted is relatively fast, the resin 60 will still get in due to the effect of the flowrate even if the length of the clearance (i.e., the length in the radial direction of the ejector pin 40, from the inner peripheral surface of the pin hole to the outer peripheral surface of the ejector pin 40) is set so that the resin 60 cannot get in. On the other hand, if a recess is not formed in the molding surface 32a and the flowrate of the resin 60 flowing over the pin hole through which the ejector pin 40 is inserted is relatively slow, the resin 60 can be inhibited from getting in simply by setting the length of the clearance (i.e., the length in the radial direction of the ejector pin 40, from the inner peripheral surface of the pin hole to the outer peripheral surface of the ejector pin 40) so that the resin 60 cannot get in.

That is, the resin 60 will not get into the first clearance 45 even if the tip end surface 41a of the first ejector pin 41 that is the ejector pin 40 that is arranged at the portion where the flowrate of the injected resin 60 is relatively slow is not arranged a predetermined distance to the right of (i.e., in a recessed position with respect to) the molding surface 32a. Therefore, it is not necessary to form the recess 52 as it is with the second ejector pin 42.

After the resin 60 has been filled up to the cavity portion 64, the pressure of the resin 60 is maintained. At this time, the resin 60 flows in at a slow flowrate also to the left of the second clearance 46 and the third clearance 47 (i.e., into the portions corresponding to the second clearance 46 of the recess 52 and the third clearance 47 of the recess 53) into which the resin 60 did not flow due to the effect of the dead water region 80. At this slow flowrate, the resin 60 will not get into the second clearance 46 or the third clearance 47. Also, the mold into which the resin 60 is injected is heated, so the resin 60 that has been filled into the cavity portion 64 is heated by the mold and hardens.

After the resin 60 is heat hardened and has set, the mold (i.e., the fixed die 20 and the movable die 30) is cooled. Then, as shown in FIG. 3B, the mold is opened by moving the movable die 30 away from the fixed die 20. At this time, the work 70 and the set resin 60 are supported by the movable die 30 and separated from the fixed die 20.

Figure 5A:
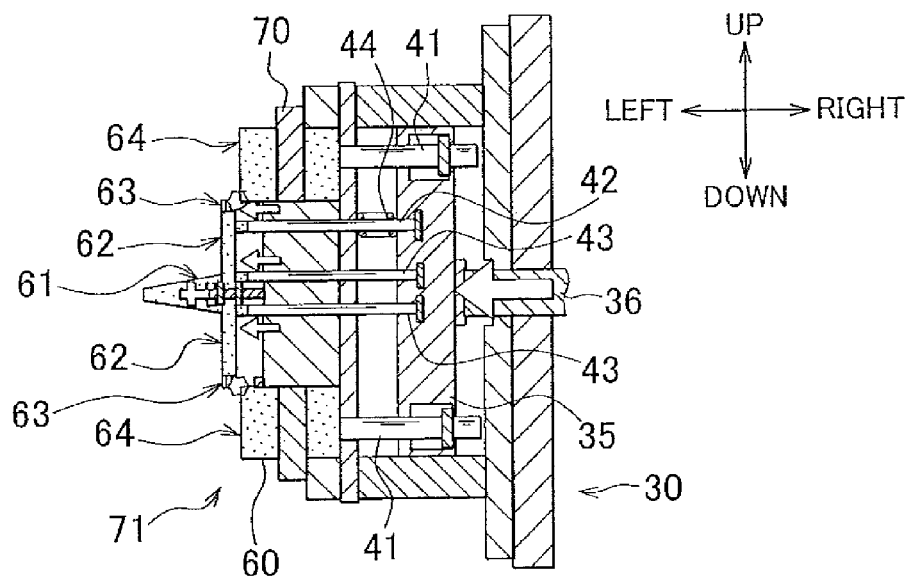
FIG. 5A is a front sectional view of the injection molding operation according to the example embodiment of the invention, showing a state in which a gate portion and a runner portion are pushed out and broken off.

As shown in FIG. 5A, after the movable die 30 is separated from the fixed die 20, the ejector rod 36 is driven to move the ejector plate 35 to the left. As a result, the second ejector pin 42 and the third ejector pin 43 protrude out from the second pin hole 33 and the third pin hole 34, respectively, such that the portions corresponding to the sprue portion 61, the runner portion 62, and the gate portion 63 of the set resin 60 are pushed out and break off from the cavity portion 64. Also, the resin 60 filled into the recess 52 and the recess 53 is also pushed out.

Figure 5B:
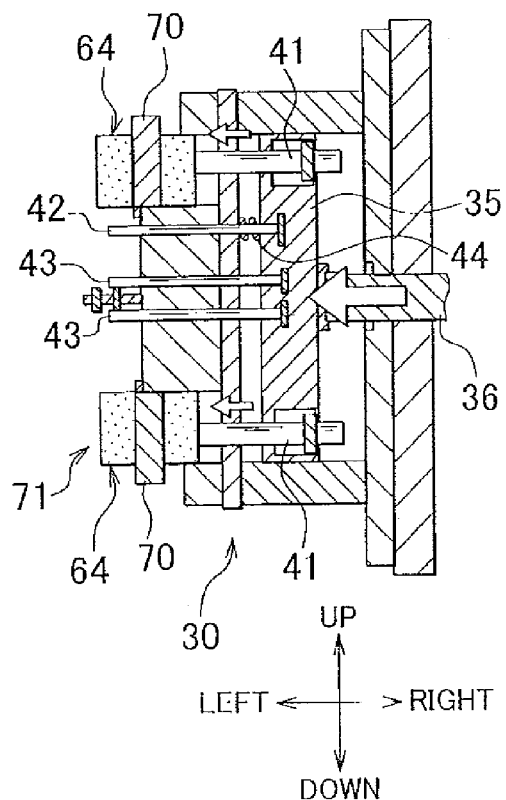
FIG. 5B is a front sectional view of the injection molding operation according to the example embodiment of the invention, showing a state in which the resin is extruded.

Then, as shown in FIG. 5B, the ejector rod 36 is driven to move the ejector plate 35 even farther to the left. As a result, the first ejector pin 41 protrudes out from the first pin hole 32, thus extruding (i.e., pushing out) the molded article 71 (i.e., the work 70 and the portion of the set resin 60 that corresponds to the cavity portion 64).

In this way, in this example embodiment, the ejector pin 40 pushes out the resin 60 to the left. Accordingly, the tip end surface 42a of the second ejector pin 42 and the tip end surface 43a of the third ejector pin 43 are recessed from (i.e., set back from or lower than) the molding surface 31a by a predetermined distance in the direction opposite the direction in which the resin 60 is extruded.

Figure 5C:
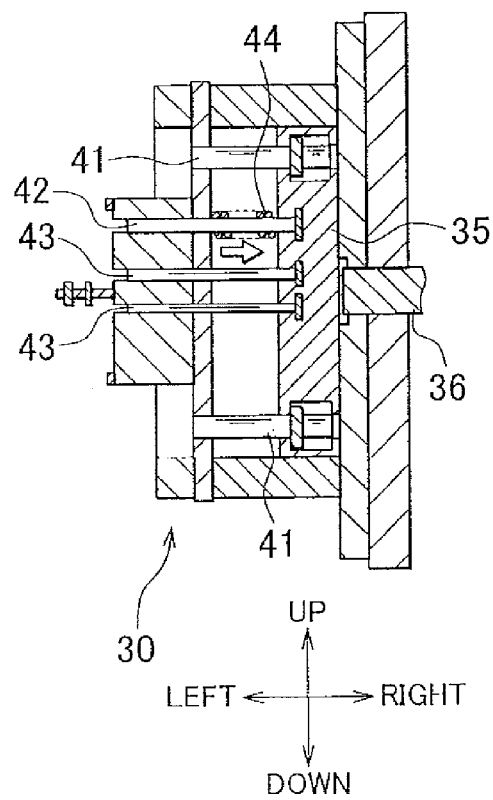
FIG. 5C is a front sectional view of the injection molding operation according to the example embodiment of the invention, showing a state in which the ejector pins are returned.

After the molded article 71 is extruded, the ejector rod 36 stops being driven. As a result, the spring 44 provided on the second ejector pin 42 urges the ejector plate 35 to the right, as shown in FIG. 5C. That is, the ejector plate 35 moves to the right. At this time, the recess 52 is formed at the portion corresponding to the second ejector pin 42, and the recess 53 is formed at the portion corresponding to the third ejector pin 43.

In this way, the injection molding apparatus 10 forms the recess 52 and the recess 53 at the portions of the molding surface 31a that correspond to the tip end surface 42a of the second ejector pin 42 that is ejector pin 40 and the tip end surface 43a of the third ejector pin 43 that is ejector pin 40, by recessing the tip end surface 42a of the second ejector pin 42 and the tip end surface 43a of the third ejector pin 43 from the molding surface 31a by a predetermined distance to the right, i.e., the direction opposite the direction in which the resin 60 is extruded, when the resin 60 is injected into the fixed die 20 and the movable die 30 that together form the mold.

Accordingly, when the resin 60 is injected into the fixed die 20 and the movable die 30, the resin 60 can be inhibited from getting into the second clearance 46 and the third clearance 47, so an operational problem with the injection molding apparatus 10 during injection molding can be inhibited. An example of such an operational problem is a case in which greater force is required to make the ejector pins 40 protrude from the pin holes, and as a result, the molded article 71 is unable to be extruded. This is because, when the ejector pins 40 are returned to the pin holes by the spring 44, the ejector pins 40 do not fully return but instead remain protruding out from the pin holes. Also, molded articles 71 can be molded one after the other without performing maintenance molding such as that performed with the related art, so work efficiency can be improved.

Incidentally, with the ejector pin 40 that is arranged at a portion where the flowrate of the resin 60 is relatively slow as it is at the cavity portion 64 in this example embodiment (i.e., with the first ejector pin 41 in this example embodiment), the tip end surface 41a is preferably arranged in line with the molding surface 31a. In this case, resin 60 will not get into the clearance even if the resin 60 is injected and there is no recess formed in the molding surface 31a. Therefore, the amount of resin used during molding can be reduced, so the injection molding manufacturing cost can be reduced.

Also, when the recess is formed in the ejector pin 40 that pushes out the cavity portion 64 (i.e., the first ejector pin 41 in this example embodiment), the distance that the tip end surface 41a is recessed is preferably set within a tolerance range set for the molded article 71. As a result, the resin 60 can be inhibited from getting into the first clearance 45 when the resin 60 is injected, without reducing the quality of the molded article 71.

Next, test results of the distance that the ejector pin 40 is recessed (i.e., set back) from the molding surface 31a and the number of times that the molded article 71 can be molded by injecting the resin 60, using the injection molding apparatus 10 will be described.

In the test, the length of the clearance (i.e., the length in the radial direction of the ejector pin 40, from the inner peripheral surface of the pin hole to the outer peripheral surface of the ejector pin 40) was set at 5 to 10 μm, unsaturated polyester resin was used as the resin 60, the injection pressure of the resin 60 was set at 10 MPa, the injection flowrate of the resin 60 was set at approximately 100 cc/sec, the resin temperature was set at 50° C., and the mold temperature was set at 150° C.

In the test, injection molding was repeatedly performed, with the ejector pin 40 in which the resin 60 would get into the clearance if no recess was formed in the molding surface 31a (e.g., the second ejector pin 42) arranged in a position recessed a predetermined distance from the molding surface 31a such that a recess was formed, and the number of times (i.e., the shot number) that the molded article 71 was formed until a problem (such as an operational problem or the like) occurs during injection molding was measured. Also, the length in the left-right direction from the molding surface 31a to the tip end surface of the ejector pin 40 (see reference character Y in FIG. 2B), i.e., the distance Y that the tip end surface of the ejector pin 40 is recessed from the molding surface 31a (i.e., the recessed distance Y of the ejector pin 40), was set to a predetermined length.

FIG. 6 shows the test results. Incidentally, the shot numbers N1 to N8 in the graph are such that the number of times increases in order from N1. That is, N1<N2<N3<N4<N5<N6<N7<N8. Also, the recessed distances Y1 to Y5 of the ejector pin 40 are such that the distance becomes longer in order from Y1. That is, Y1<Y2<Y3<Y4<Y5.

In the test results, when the recessed distance Y of the ejector pin 40 is short, a problem occurs at a small shot number. For example, when the recessed distance Y of the ejector pin 40 is Y1 (mm), a problem occurs at a shot number of approximately N1 (times). On the other hand, when the recessed distance Y of the ejector pin 40 is long, a problem occurs at a larger shot number. For example, when the recessed distance Y of the ejector pin 40 is Y4, a problem occurs at a shot number of approximately N5 (times).

From these test results, it is apparent that there is a correlation between the recessed distance Y of the ejector pin 40 and the shot number. Also, the following expression is derived from a graph G that shows the test results.

$$Y = 7.98 \times 10^{-5} N - 0.039$$

Here, Y is the distance (mm) that the tip end surface of the ejector pin 40 is recessed from the molding surface 31a, and N is the number of times that the molded article 71 is molded by injecting the resin 60 into the fixed die 20 and the movable die 30 (i.e., N is the shot number).

According to the test results, it is evident that a longer recessed distance Y of the ejector pin 40 enables injection molding to be successively performed more times. That is, it is evident that it is possible to reliably inhibit the resin 60 from getting into the clearance. This is because the shape of the dead water region 80 becomes larger toward the radially inner side of the ejector pin 40 as the recessed distance Y of the ejector pin 40 becomes longer. As a result, however, the amount of resin used for injection molding increases (i.e., the amount of resin filled into the recess of the tip end portion of the ejector pin 40 increases), i.e., the injection molding manufacturing cost increases.

Therefore, the recessed distance Y of the ejector pin 40 is calculated using the expression above based on the shot number until maintenance is performed on the injection molding apparatus 10 (that is, a target number of times that the molded article 71 is able to be molded without maintenance being performed on the injection molding apparatus 10) or the shot number corresponding to the life of the fixed die 20 and the movable die 30 (that is, a shot number corresponding to the life of the injection molding apparatus 10), and the tip end surface of the ejector pin 40 is recessed from the molding surface 31a by the calculated recessed distance Y. Accordingly, an increase in the amount of resin due to forming the recess can be kept to the necessary minimum, so an increase in the injection molding manufacturing cost can be suppressed. That is, the expression above is an expression indicating an indirect correlation between the amount of resin that gets into the clearance that has been decreased by the formation the dead water region 80, and the cumulative injection amount (i.e., an upper limit value when no problem occurs).

In this way, the tip end surface 42a of the second ejector pin 42 and the tip end surface 43a of the third ejector pin 43 are recessed from the molding surface 31a such that the expression above is satisfied, when the resin 60 is injected.

Incidentally, the recessed distance Y of the ejector pin 40 is preferably set to a distance that is slightly longer (such as approximately 0.03 mm longer) than the recessed distance calculated based on the expression above. This makes it possible to more reliably inhibit the resin 60 from getting into the clearance.

Also, the injection molding apparatus 10 may be configured to be able to control the recessed distance Y of the ejector pin 40, and appropriately recess the ejector pin 40 from the molding surface 31a according to the shot number.

Figure 7A:
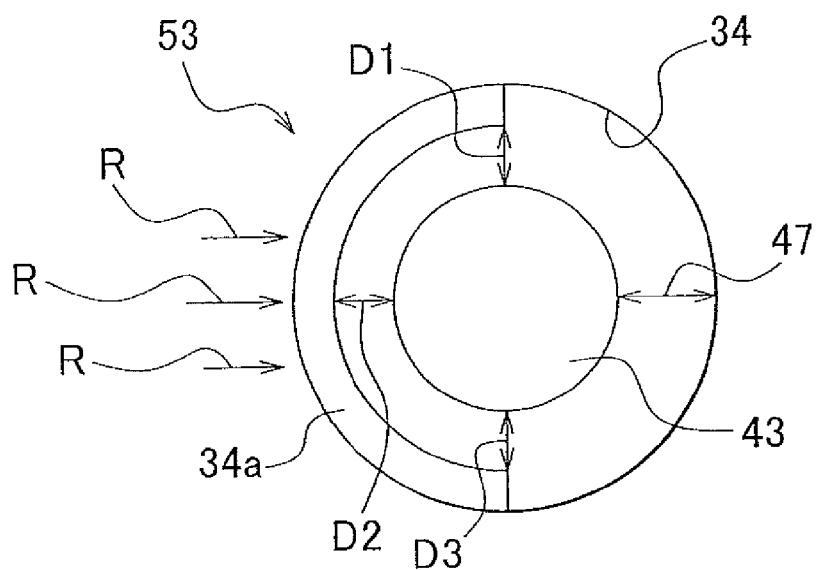
FIG. 7A is a partial left side view of a protrusion formed on a third pin hole according to the example embodiment of the invention.
Figure 7B:
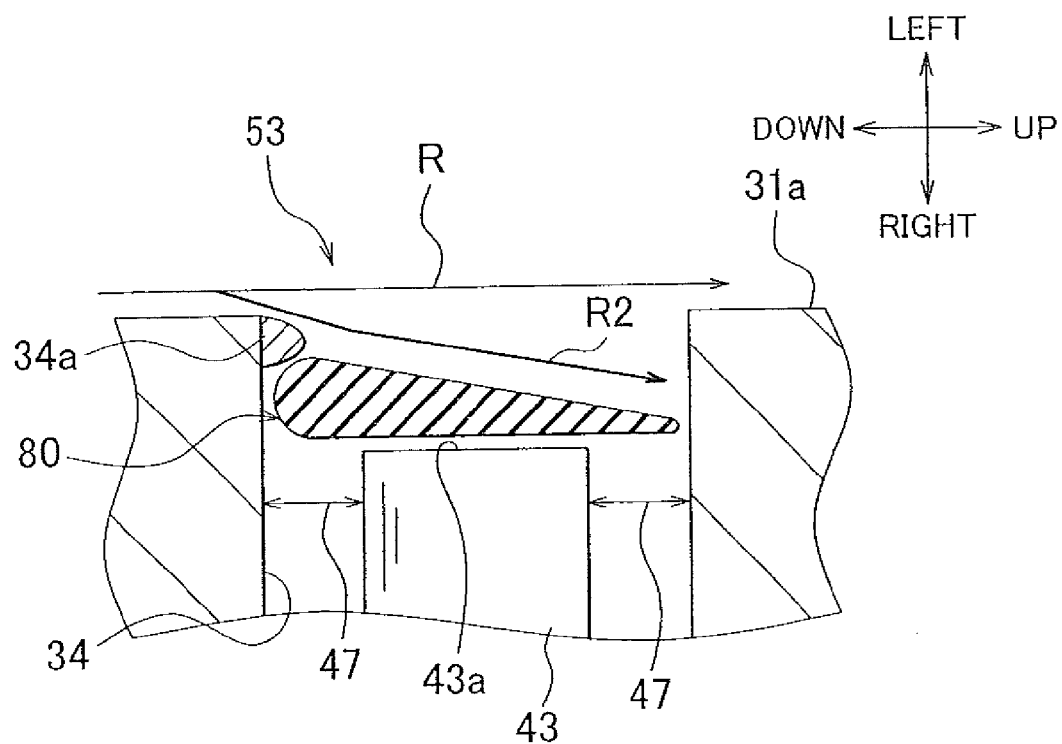
FIG. 7B is a view of the protrusion formed on the third pin hole according to the example embodiment of the invention.

As shown in FIGS. 7A and 7B, the injection molding apparatus 10 may also inhibit the resin 60 from getting into the second clearance 46 and the third clearance 47 by forming a protrusion 34a on both the second pin hole 33 and the third pin hole 34 that are pin holes corresponding to the ejector pins 40 that are recessed from the molding surface 31a. Hereinafter, the protrusion 34a formed in the third pin hole 34 will be described.

The protrusion 34a protrudes toward the radially inner side of the third ejector pin 43 from the inner peripheral surface of the third pin hole 34 (i.e., the pin hole). The protrusion 34a is formed on the upstream side in the flow direction of the resin 60, and on the molding surface 31a side (i.e., the left side) of the tip end surface 43a of the third ejector pin 43 (i.e., the ejector pin 40). The protrusion 34a in this example embodiment is formed in a generally semicircular shape when viewed from the left side. The protrusion 34a in this example embodiment is also formed with a generally semicircular-shaped cross section, as is shown in FIG. 7B.

The protrusion 34a is formed so as not to overlap with the third ejector pin 43 when viewed from the left side. More specifically, the protruding length of the protrusion 34a is set shorter than the shortest length of the third clearance 47, from among the lengths of the third clearance 47 in the radial direction of the third ejector pin 43, from the inner peripheral surface of the third pin hole 34 that corresponds to the portion on which the protrusion 34a is formed to the outer peripheral surface of the third ejector pin 43. Accordingly, gaps D1, D2, and D3 are formed between the tip end of the protrusion 34a and the outer peripheral surface of the third ejector pin 43, when viewed from the left side (see arrows D1, D2, and D3 in FIG. 7A).

Further, when the protrusion 34a is formed on the third pin hole 34 and the pressure of the resin 60 is maintained, the resin 60 is filled between the protrusion 34a and the third clearance 47. Therefore, the protruding length of the protrusion 34a is set to a length at which the protrusion 34a will not interfere with the extrusion of the resin 60 by the third ejector pin 43 when the resin 60 is extruded by the third ejector pin 43.

That is, the protruding length of the protrusion 34a is set to a length that will not interfere with the protruding operation of the third ejector pin 43. More specifically, the protruding length of the protrusion 34a is set to a length at which the third ejector pin 43 will not hit the protrusion 34a.

When this kind of protrusion 34a is formed, an angle created by a flow direction R of the resin 60 and a direction R2 in which the resin 60 flows in toward the recess 53 when the resin 60 is injected can be made smaller than an angle created by the flow direction R of the resin 60 and a direction R1 in which the resin 60 flows in toward the recess 53 when the protrusion 34a is not formed, as shown in FIGS. 4 and 7I3.

Accordingly, the dead water region 80 that forms on the upstream side of the recess 53 can be formed over the entire pin hole (i.e., the third pin hole 34). Therefore, the resin 60 can be inhibited from getting into the clearance (i.e., the third clearance 47) when the resin 60 is injected. Therefore, an operational problem with the injection molding apparatus 10 can be inhibited, so production efficiency can be improved. Also, the dead water region 80 can be stably formed over the entire pin hole even if there is a change or variation in the viscosity and the fluid pressure and the like of the resin 60.

Figure 8A:
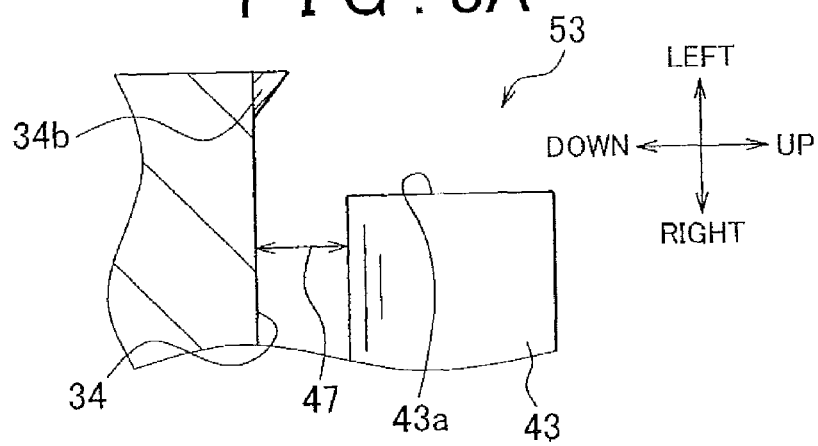
FIG. 8A is a view of another example embodiment of the protrusion formed on the third pin hole, in which the protrusion has an inverted triangular shape.
Figure 8B:
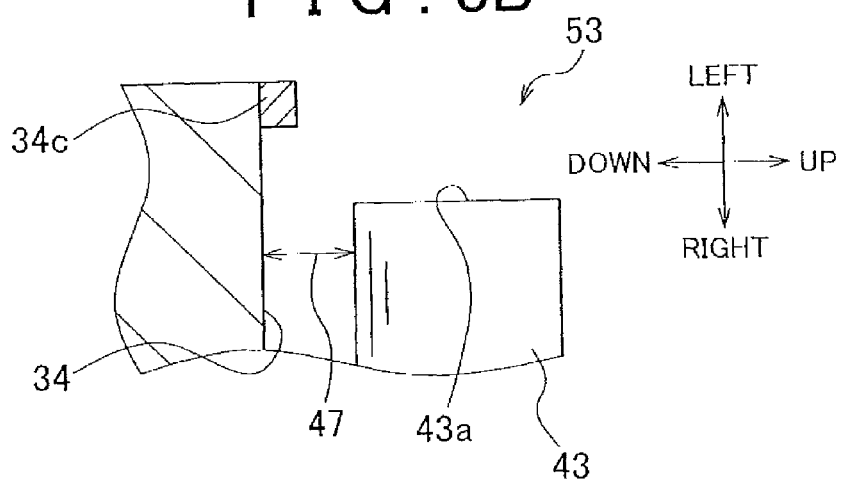
FIG. 8B is a view of another example embodiment of the protrusion formed on the third pin hole, in which the protrusion has a square shape.
Figure 8C:
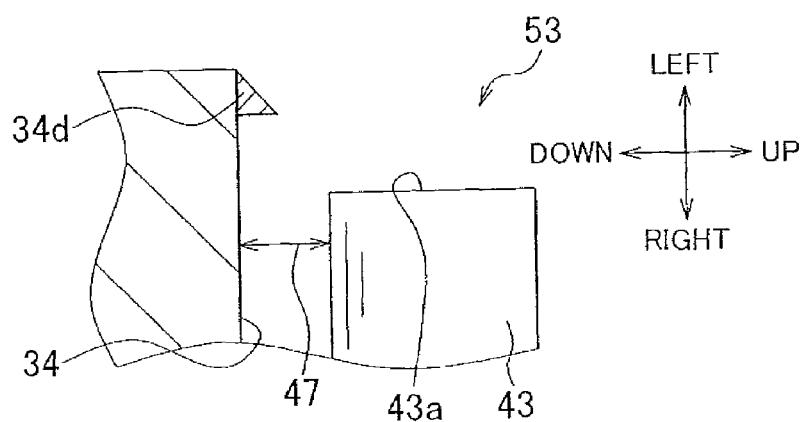
FIG. 8C is a view of another example embodiment of the protrusion formed on the third pin hole, in which the protrusion has a triangular shape.

The shape of the cross section of the protrusion 34a is not limited to being generally semicircular. That is, the cross section of the protrusion 34a may also have an inverted triangular shape as shown in FIG. 8A (see 34b), a square shape as shown in FIG. 8B (see 34c), or a triangular shape as shown in FIG. 8C (see 34d). The inverted triangular shape shown in FIG. 8A is a triangular shape in which the left end surface of the protrusion 34b is flush with the molding surface 31a and the right end surface of the protrusion 34b is a surface that extends from the upper left to the lower right. The triangular shape in FIG. 8C is a triangular shape in which the left end surface of the protrusion 34d is a surface that extends from the lower left to the upper right, and the right end surface of the protrusion 34d is a surface that extends vertically.

In this example embodiment, the protrusions 34a to 34d are formed on the third pin hole 34. However, if the protrusions 34a to 34d are formed on the second pin hole 33, the protrusions 34a to 34d may be formed just as they are on the third pin hole 34. In this case, the dead water region 80 that forms on the upstream side of the recess 52 of the second pin hole 33 can be formed over the entire second pin hole 33. That is, an effect similar to that obtained when the protrusions 34a to 34d are formed on the third pin hole 34 can also be obtained.

Figure 9A:
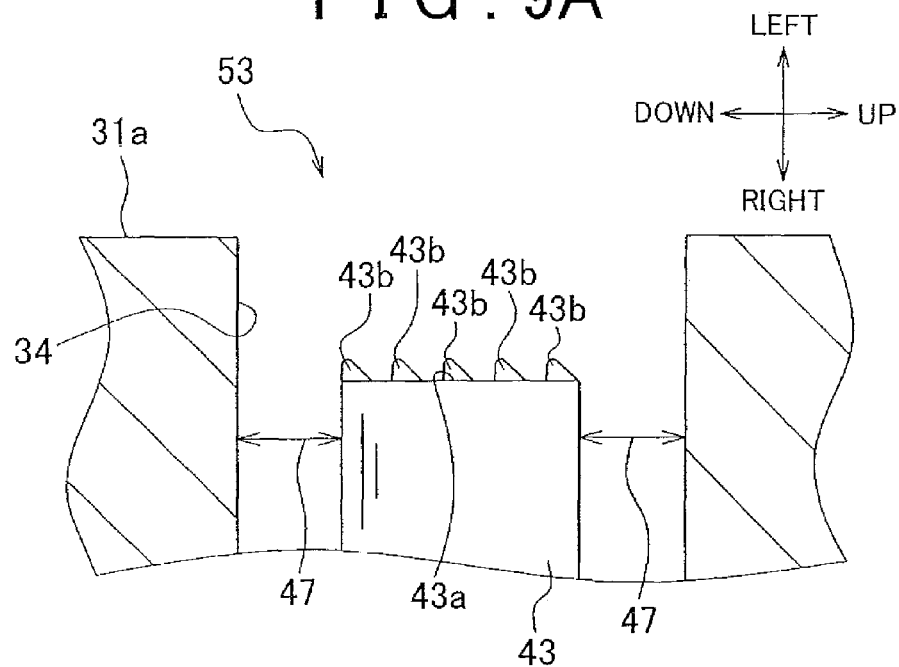
FIG. 9A is a view of protrusions formed on the ejector pin.
Figure 9B:
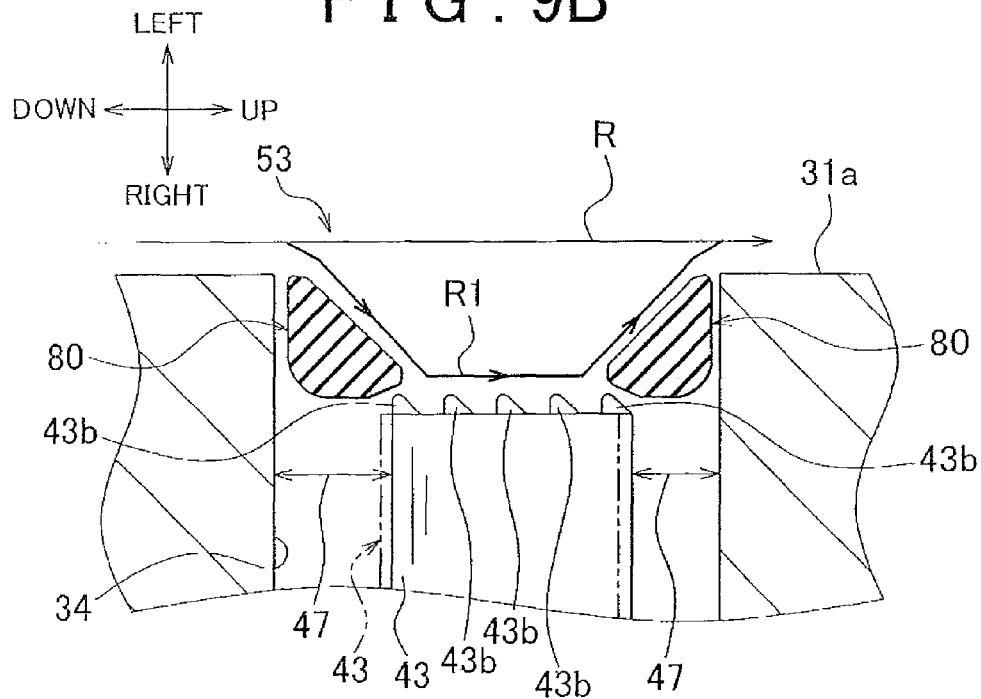
FIG. 9B is a view of the protrusions formed on the ejector pin, showing a state in which the ejector pin is moving to the downstream side.

The shapes of the tip end surface 42a of the second ejector pin 42 and the tip end surface 43a of the third ejector pin 43, that are the ejector pins 40 that form the recess 52 and the recess 53, are flak (i.e., no protrusions are formed on the tip end surfaces 42a and 43a of the ejector pins 42 and 43) in FIGS. 2B and 2C, but the invention is not limited to this. That is, a plurality of protrusions 43b as shown in FIGS. 9A and 9B may also be formed on the tip end surface 42a of the second ejector pin 42 and the tip end surface 43a of the third ejector pin 43. Hereinafter, a case will be described in which the protrusions 43b are formed on the tip end surface 43a of the third ejector pin 43.

The protrusions 43b are formed on the tip end surface 43a of the third ejector pin 43 (i.e., the ejector pin 40), and protrude toward the left, i.e., the direction in which the resin 60 is extruded.

With this kind of third ejector pin 43, the resin 60 that flows in toward the recess 53 contacts the protrusions 43b and pushes the third ejector pin 43 toward the downstream side. That is, the third ejector pin 43 moves toward the downstream side, such that the length of the third clearance 47 in the radial direction of the third ejector pin 43, from the inner peripheral surface of the third pin hole 34 to the outer peripheral surface of the third ejector pin 43, becomes longer on the upstream side, and the length of the third clearance 47 in the radial direction of the third ejector pin 43, from the inner peripheral surface of the third pin hole 34 to the outer peripheral surface of the third ejector pin 43, becomes shorter on the downstream side (see the third ejector pin 43 indicated by the chain double-dashed line in FIG. 9B).

Here, the shape of the dead water region 80 is larger on the upstream side than it is on the downstream side. That is, the protrusions 43b cause the third ejector pin 43 to move toward the downstream side, and as a result, the shape of the dead water region 80 becomes somewhat smaller. However, on the upstream side where the dead water region 80 has a large shape, the length of the third clearance 47 can be lengthened. Meanwhile, on the downstream side where the shape of the dead water region 80 is small, the length of the third clearance 47 in the vertical direction can be shortened.

Accordingly, the length of the third clearance 47 in the radial direction of the third ejector pin 43, from the inner peripheral surface of the third pin hole 34 to the outer peripheral surface of the third ejector pin 43, can be made to correspond to the shape of the dead water region 80. As a result, it is possible to more reliably inhibit the resin 60 from getting into the third clearance 47.

Incidentally, as long as the protrusions 43b are able to move the third ejector pin 43 to the downstream side, the shape and number of the protrusions 43b are not limited. That is, only one of the protrusions 43b may be formed on the tip end surface 43a of the third ejector pin 43, for example.

If the protrusions 34b are formed on the tip end surface 42a of the second ejector pin 42, the protrusions 34b may be formed just as they are on the third ejector pin 43. In this case, an effect similar to that obtained at the third ejector pin 43 can also be obtained at the second ejector pin 42.

Figure 10:
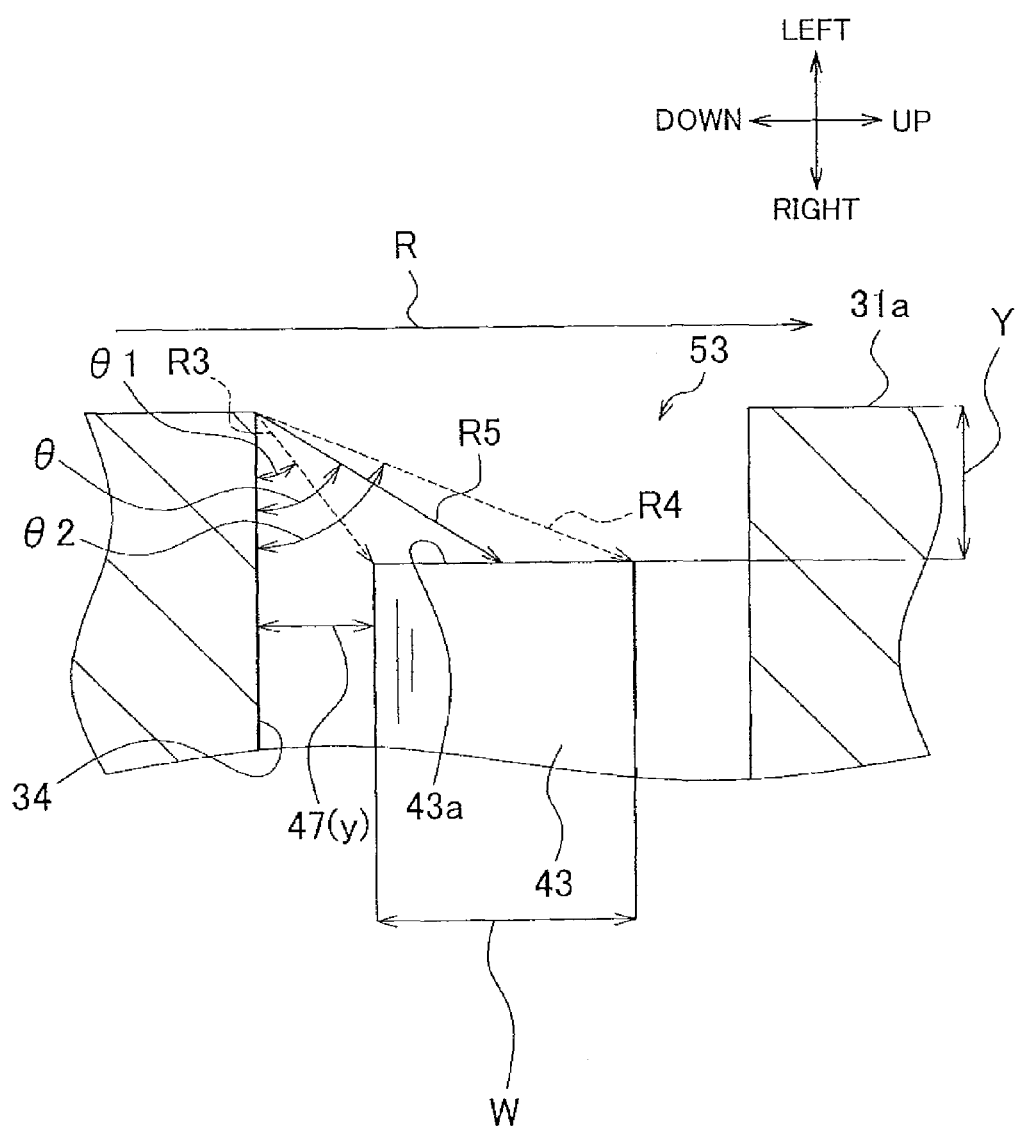
FIG. 10 is a view of a resin inflow angle.
Figure 11:
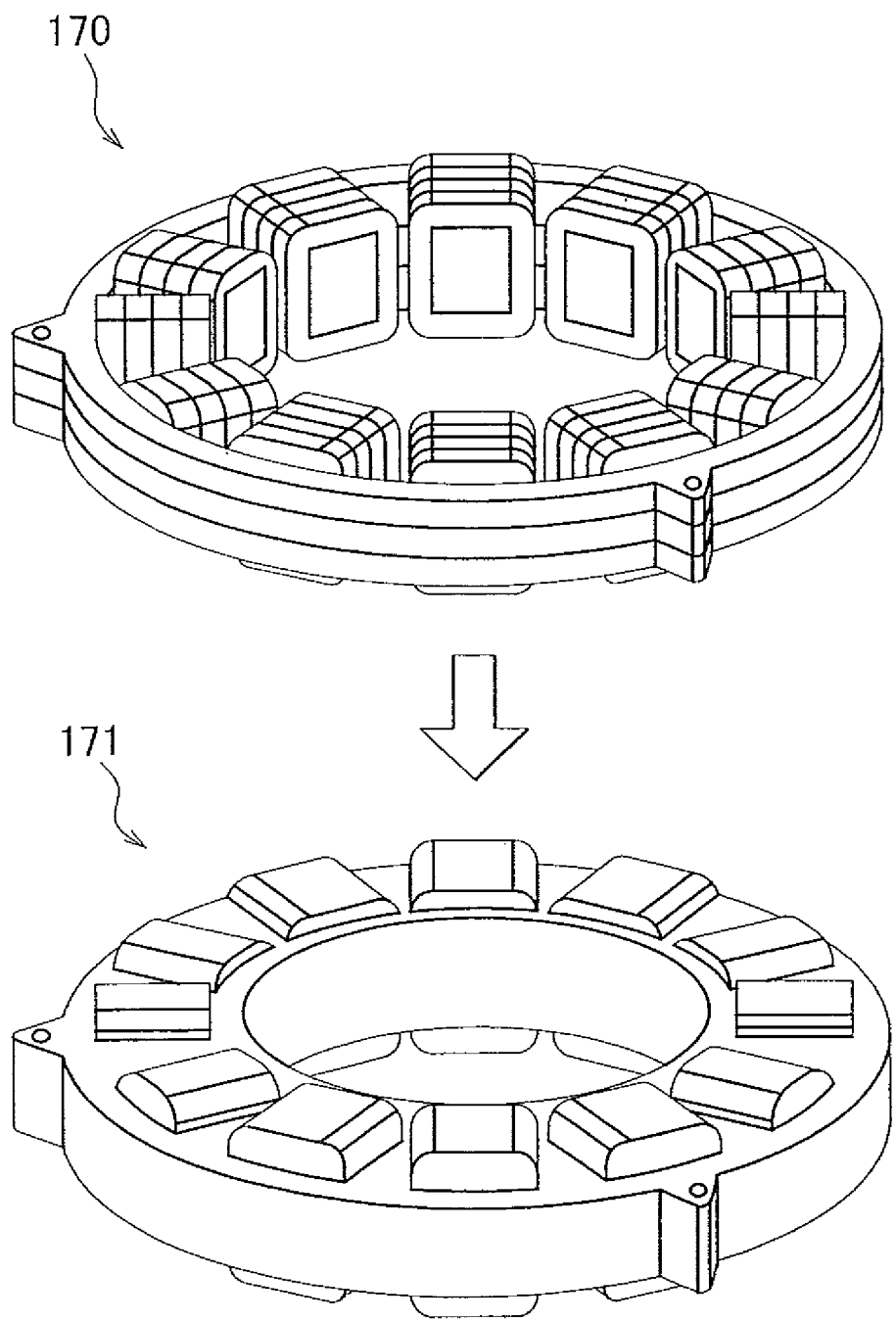
FIG. 11 is a perspective view a state in which an insert coil is molded with resin, according to related art.
Figure 12A:
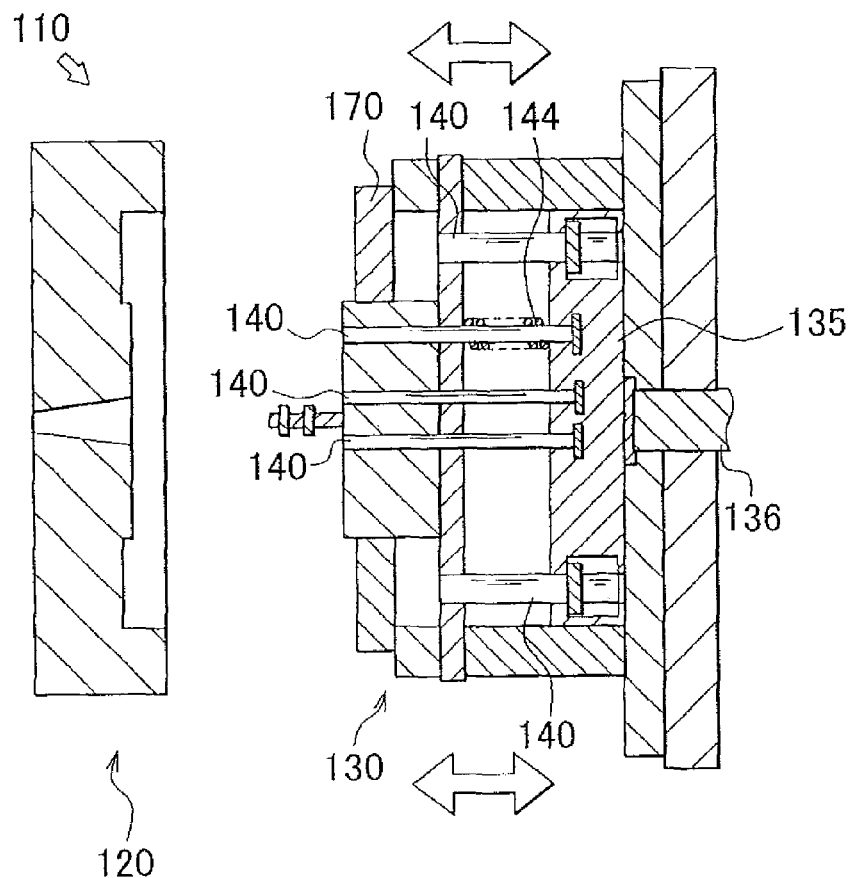
FIG. 12A is a front sectional view of the overall structure of an injection molding apparatus according to related art.
Figure 12B:
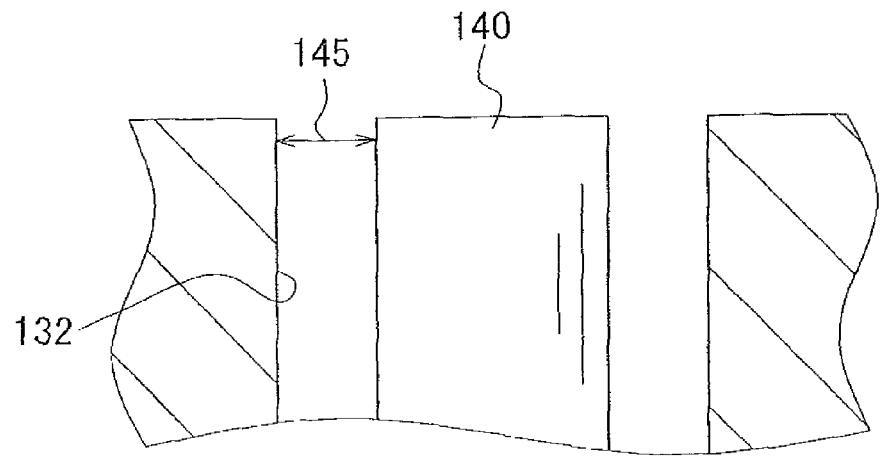
FIG. 12B is a view of an ejector pin of the injection molding apparatus according to the related art.
Figure 13A:
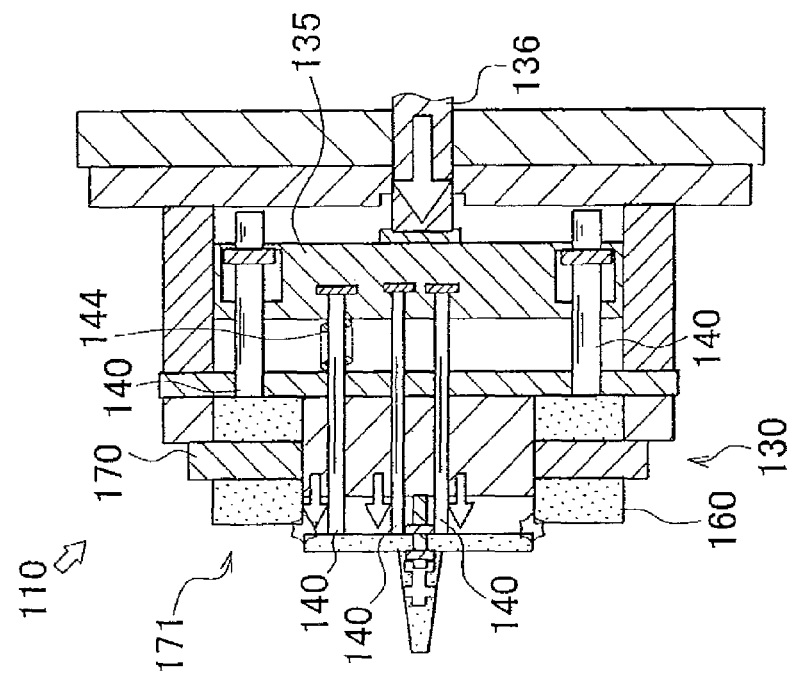
FIG. 13A is a front sectional view of an injection molding operation according to the related art, showing a state in which the mold is open.
Figure 13B:
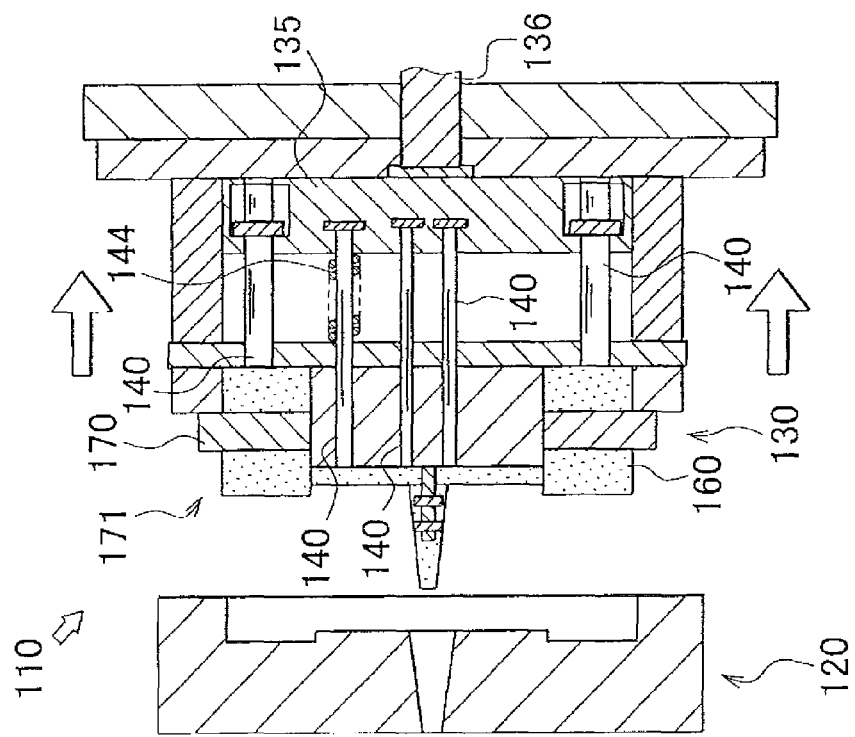
FIG. 13B is a front sectional view of an injection molding operation according to the related art, showing a state in which a gate portion and a runner portion are pushed out and broken off.
Figure 14A:
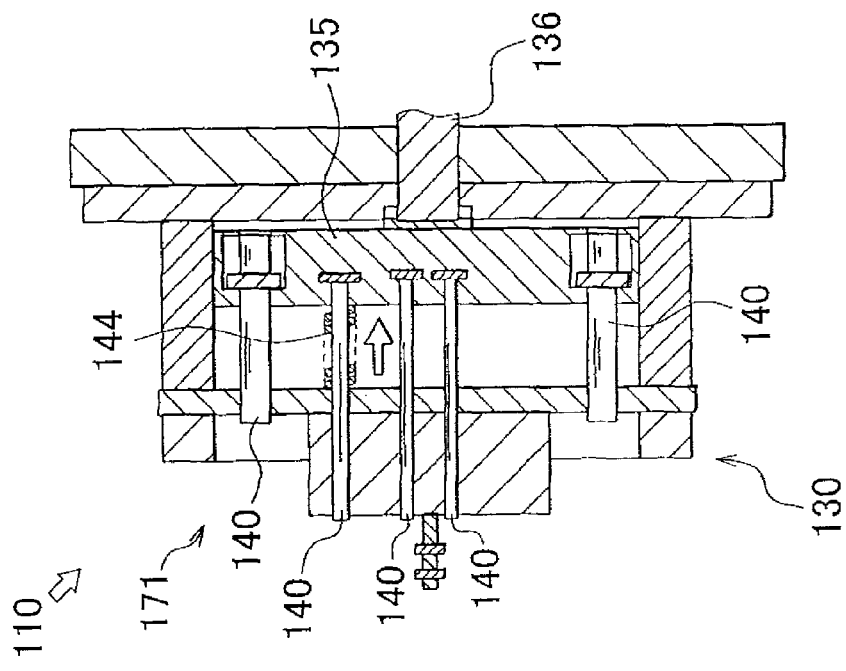
FIG. 14A is a front sectional view of an injection molding operation according to the related art, showing a state in which resin is extruded.
Figure 14B:
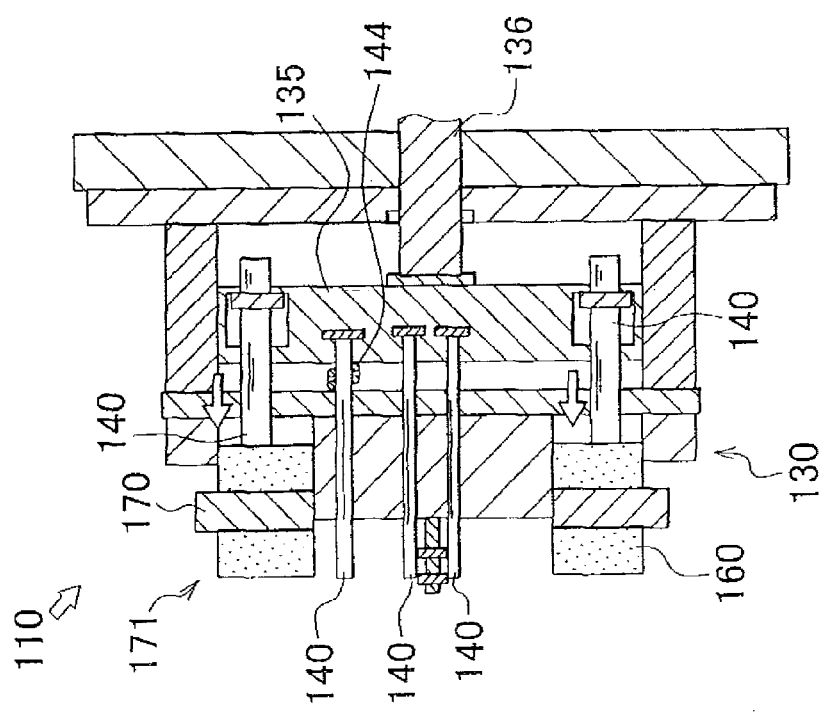
FIG. 14B is a front sectional view of an injection molding operation according to the related art, showing a state in which the ejector pins remain protruding from the pin holes.

The injection molding apparatus 10 may also inhibit the resin 60 from getting into a clearance corresponding to the ejector pin 40 that is recessed from the molding surface 31a by controlling the flow of the resin 60, as shown in FIG. 10. Hereinafter, a case in which the flow of the resin 60 that flows into the recess 53 is controlled with be described.

The flow of the resin 60 can be controlled by, for example, changing the temperature (i.e., the temperature of the resin 60 injected into the mold or the temperature of the fixed die 20 and the movable die 30, i.e., the mold), the flowrate and intervals (such as the time intervals when extruding intermittently) when injecting the resin 60, and the dimensions of the flow passage for the resin 60.

Incidentally, hereinafter, an angle created between an axial direction (i.e., the left-right direction) of the third ejector pin 43 and a direction R3 from the upstream end portion of the third pin hole 34 to the upstream end portion of the tip end surface 43a of the third ejector pin 43 will be referred to as "angle θ1". Also, an angle created between the axial direction of the third ejector pin 43 and a direction R4 from the upstream end portion of the third pin hole 34 to the downstream end portion of the tip end surface 43a of the third ejector pin 43 will be referred to as "angle θ2". Further, an angle created between the axial direction of the third ejector pin 43 and the direction R5 in which the resin 60 flows in toward the recess 53 will be referred to as the "inflow angle θ". In the example embodiment described below, the dead water region 80 (see FIG. 4) will be described as not being formed as a result of the effects of molding conditions such as the viscosity of the resin 60 and the like.

If the inflow angle θ is less than the angle θ1 (i.e., if angle θ1>inflow angle θ), the resin 60 will flow in toward the third clearance 47 between the upstream side of the third ejector pin 43 and the upstream side of the third pin hole 34. In this case, the resin 60 may get in on the upstream side of the third clearance 47. Also, if the inflow angle θ is greater than the angle θ2 (i.e., if angle θ2<inflow angle θ), the resin 60 will flow in toward the third clearance 47 between the downstream side of the third ejector pin 43 and the third pin hole 34. In this case, the resin 60 may get in on the downstream side of the third clearance 47.

On the other hand, if the inflow angle θ equal to or greater than the angle θ1 and equal to or less than the angle θ2 (i.e., if angle θ1≤inflow angle θ≤angle θ2), the resin 60 will flow in toward the tip end surface tip end surface 43*a* of the third ejector pin 43. That is, the resin 60 will not flow in toward the third clearance 47, so the resin 60 will not get into the third clearance 47. If the resin 60 that has contacted the tip end surface 43*a* of the third ejector pin 43 contacts the downstream end portion of the third pin hole 34 and flows in toward the third clearance 47, the flowrate of the resin 60 will be slow, so the resin 60 will not flow into the third clearance 47.

That is, the resin 60 will not flow into the third clearance 47 if the flow of the resin 60 is controlled such that the inflow angle θ satisfies the expression below, when the diameter of the third ejector pin 43 (i.e., the ejector pin 40) that is recessed from the molding surface 31*a* is designated W (mm), the length of the third clearance 47 (i.e., the clearance), that is, the length in the radial direction of the ejector pin, from the upstream end portion of the third ejector pin 43 to the upstream end portion of the third pin hole 34 (i.e., the pin hole), is designated y (mm), and the distance that the tip end surface 43*a* of the third ejector pin 43 is recessed from the molding surface 31*a* is designated Y (mm).

$$\cot(y/Y) \le \theta \le \cot\{(W+y)/Y\}$$

Controlling the flow of the resin 60 to satisfy the expression above makes it possible to inhibit the resin 60 from flowing into the clearance (i.e., the third clearance 47) even at a position that is offset from the axial center of the ejector pin 40 (i.e., the third ejector pin 43) in the directions toward the front and back of the paper on which FIG. 10 is drawn. That is, the resin 60 can be inhibited from flowing into the whole clearance.

Therefore, it is still possible to inhibit the resin 60 from getting into the clearance (i.e., the third clearance 47) even if the dead water region 80 is not able to be formed due to the effect of the molding conditions such as the viscosity of the resin 60 and the like. As a result, it is possible to inhibit an operational problem with the injection molding apparatus 10 from occurring, and therefore possible to improve production efficiency.

Incidentally, when controlling the flow of the resin 60 that flows into the recess 52, it may be done just as it is with the recess 53. In this case, an effect similar to that obtained at the recess 53 may also be obtained at the recess 52.

The injection molding apparatus 10 in this example embodiment is configured to mold the resin 60 around the work 70, but the invention is not limited to this. That is, the invention may be widely applied in an injection molding apparatus that is used for injection molding.

Also, in this example embodiment, unsaturated polyester resin that is a thermosetting resin is used as the material used in injection molding, but the invention is not limited to this. That is, thermoplastic resin may also be used as the material.

In this case, the length of the clearance in the radial direction of the ejector pin 40, from the inner peripheral surface of the pin hole to the outer peripheral surface of the ejector pin 40, is set to a length at which the thermoplastic resin or the like cannot get in when the pressure is maintained. Moreover, metal such as aluminum may also be used as the material used in injection molding. In this case, the length of the clearance in the radial direction of the ejector pin 40, from the inner peripheral surface of the pin hole to the outer peripheral surface of the ejector pin 40, is set to a length at which the aluminum or the like cannot get in when the pressure is maintained.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

The invention claimed is:

1. An injection molding apparatus, comprising:
   a mold that includes a molding surface in which a pin hole is formed; and
   at least one ejector pin that is inserted through the pin hole and that includes an outer peripheral surface facing an inner peripheral surface of the pin hole,
   wherein the injection molding apparatus extrudes the material by making a tip end surface of the at least one ejector pin protrude out of the pin hole, after closing a mold, injecting material into the mold, setting the material, and opening the mold,
   wherein, while material is injected into the mold, a recess portion is formed in a portion of the molding surface that corresponds to the tip end surface of the ejector pin by recessing the tip end surface of the ejector pin from the molding surface by a predetermined distance in a direction opposite a direction in which the material is extruded, and
   wherein, when the predetermined distance is designated as Y (mm) and a number of times that a molded article is molded by injecting the material into the mold is designated as N (times), the predetermined distance satisfies the expression $Y = 7.98 \times 10^{-5} N - 0.039$.

2. The injection molding apparatus according to claim 1, wherein at least one protrusion that protrudes in a direction in which the material is extruded is formed on the tip end surface of the ejector pin.

3. The injection molding apparatus according to claim 1, wherein when a diameter of the ejector pin is designated W (mm), a length of clearance from an upstream side end portion of the ejector pin in a flow direction of the material to an upstream side end portion of the pin hole corresponding to the ejector pin in the flow direction of the material is designated y (mm), the predetermined distance is designated Y (mm), and an angle created between an axial direction of the ejector pin and a direction in which the material flows into the recess is designated θ (°), flow of the material is controlled such that an expression $\cot(y/Y) \le \theta \le \cot\{(W+y)/Y\}$ is satisfied.

4. The injection molding apparatus according to claim 1,
   wherein a protrusion portion that protrudes toward a radially inner side of the ejector pin is formed on an inner peripheral surface of the pin hole corresponding to the ejector pin that is recess from the molding surface, on an upstream side in a flow direction of the material and on the molding surface side with respect to the tip end surface of the ejector pin, and wherein a protruding dimension of the protrusion portion is set to a length at which the protrusion portion does not interfere with a protruding operation of the ejector pin.

* * * * *

UNITED STATES PATENT AND TRADEMARK OFFICE
CERTIFICATE OF CORRECTION

PATENT NO. : 8,790,102 B2
APPLICATION NO. : 13/642419
DATED : July 29, 2014
INVENTOR(S) : Kenshiro Moride et al.

It is certified that error appears in the above-identified patent and that said Letters Patent is hereby corrected as shown below:

In the Specification

Column 5, line 48, change "is configured to, be able" to -- is configured to be able --.

Column 13, line 16, change "FIGS. 4 and 713" to -- FIGS. 4 and 7B --.

Column 13, line 53, change "recess 53, are flak" to -- recess 53, are flat --.

Signed and Sealed this
Fourteenth Day of April, 2015

Michelle K. Lee
*Director of the United States Patent and Trademark Office*